March 5, 1929.     E. R. CARROLL     1,704,076
AMPHIBIAN AEROPLANE WITHOUT BOAT SHAPED PONTOONS
Filed Dec. 17, 1927     2 Sheets-Sheet 1
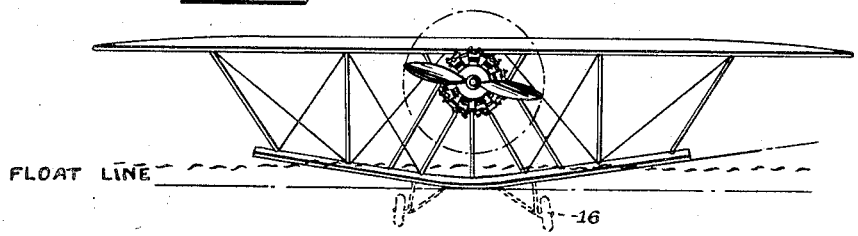
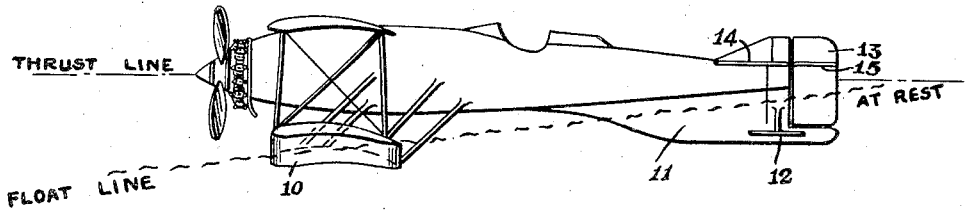
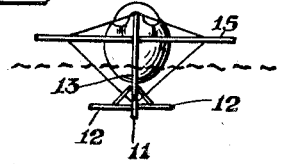
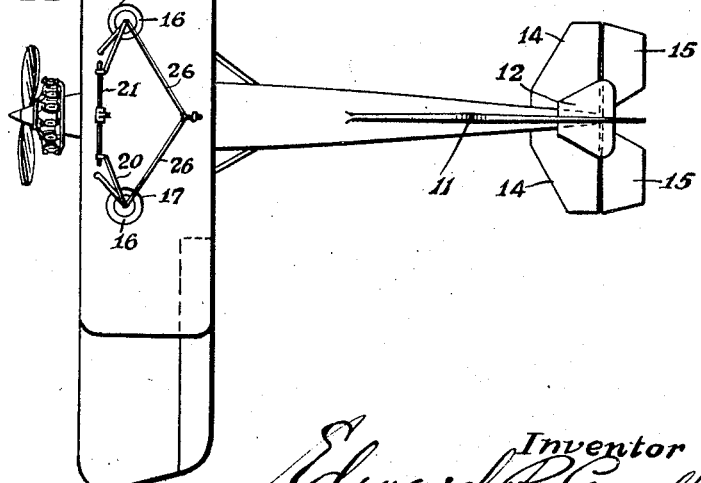
Inventor
Edward R. Carroll

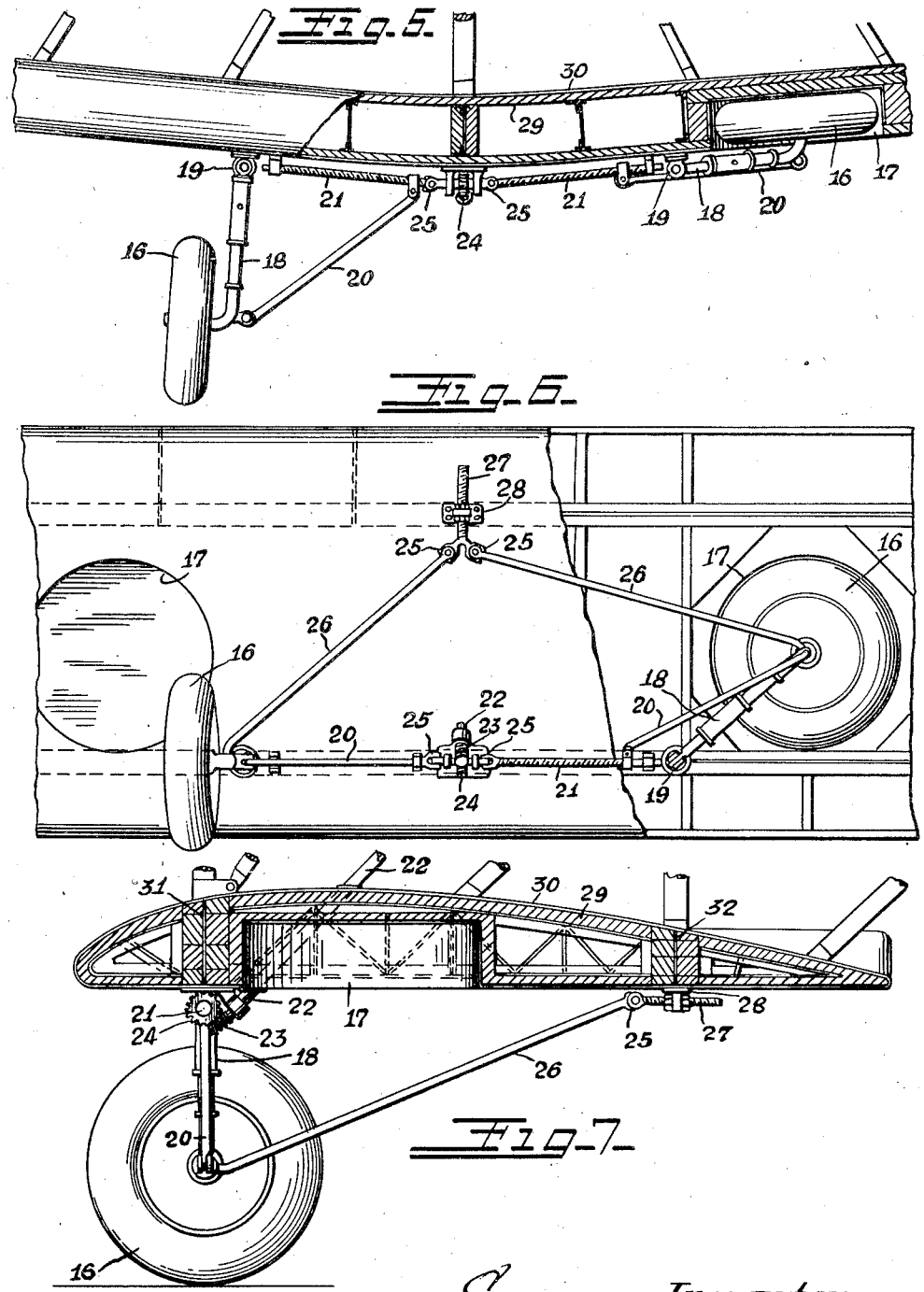

Patented Mar. 5, 1929.

1,704,076

UNITED STATES PATENT OFFICE.

EDWARD R. CARROLL, OF BURLINGAME, CALIFORNIA.

AMPHIBIAN AEROPLANE WITHOUT BOAT-SHAPED PONTOONS.

Application filed December 17, 1927. Serial No. 240,791.

My invention relates broadly to aircraft and more particularly to means of sustaining an aeroplane afloat on water, enabling it to take off from water as well as alight and take off on land.

The objects of my invention are, among others, to provide a body or structure of such shape as to sustain the aeroplane while in the air as well as when afloat; to provide sufficient displacement to float the aeroplane in the form of an airfoil; to distribute the displacement along the greater axis of the aeroplane to lessen strain in rough water; to provide a construction of airfoil section that will withstand the surface friction and structural stresses of alighting and take off on water; to provide means for planing such airfoil on water; to provide means for keeping such airfoil surface tangent to the line of flight while afloat and in the air; and to provide means of alighting on land, decks of vessels and other solid surfaces having minimum resistance while in the air during flight.

Other objects of the invention are to reduce the weight and windage of an aeroplane intended for sea use by eliminating pontoons or other boat shaped appendages and to utilize the flat surfaces of landing wheels as well as the wing surface to plane on, both afloat and in the air; to reduce the cost and weight of an aeroplane suitable for both land and water use, so that all planes may be amphibian; to provide a tail fin having sufficient surface for planing on water, as well as displacement for floating the fuselage, and strong enough to act as a tail skid; and to provide novel methods of constructing wing spars, wheel webs and wings to further the objects of the invention.

With these and other objects in view, which may be more fully understood from the following description, my invention consists in the constructions, combinations and arrangements of parts, together with such modifications and variations as may be apparent to one skilled in the art to which the invention appertains, described in the following specifications and claims.

Figure 1 is a front elevation.
Figure 2 is a side elevation.
Figure 3 is a plan view of the aeroplane bottom up.

Figure 4 is an end view.
Figure 5 is a front elevation of the retracting mechanism in detail.
Figure 6 is a plan view of the retracting mechanism seen from beneath.
Figure 7 is a section showing the retracting mechanism.

One form of the invention is illustrated in the accompanying drawings, forming a part of these specifications, in which Fig. 1 is a front elevation, showing approximate relative position of the wings, motor, propeller, etc. and the line of floatation on water when at rest. The fuselage is placed in a novel position in relation to the wings, being raised above lower wing to such height as to allow propeller to clear the water. This gap, between wings may be as great as desired. The lower wing, which serves as a float, has a pronounced dihedral. The lowest point of wing being under the center of gravity of the plane, it engages water first on alighting and sustains water pressure until the instant of take off. Thus the arresting effect on alighting is centered under the center of gravity. Novelty is claimed in the use of dihedral or curve in graduating the displacement to the speed of the plane.

As the plane loses speed, it settles in the water and a greater portion of the wing becomes submerged. I am aware that aeroplane wings have long used dihedral to add steadiness to flight, so novelty is only claimed for its use in combination with a raised fuselage, a vertical fin extending down from the fuselage to engage the water on alighting or in taking off, and for its use in graduating the displacement of the wing float to the speed of the plane.

The lower wing is a true airfoil in section, and may be varied in size or proportion as it is desired to provide greater or lesser buoyancy, or for structural reasons; or the upper wing may be eliminated and a low wing monoplane designed, with one or more engines, using the invention. The single wing, in this case being the flotation member; with the engine above it at a height to clear the water with the propellers.

Fig. 2 is a side elevation of a biplane. The lower wing 10 is shown directly under the upper wing, but it may be staggered forward or aft as needed by the distribution of weights or other reasons.

The fin 11 is used to keep the wings steady when afloat, and at right angles to the line of flight. It engages the water at same instant as the wing touches in alighting and is the last to leave water. Having a substantial metal or hardwood keel, it acts as a tail skid on land. Its thickness is sufficient to provide buoyancy sufficient to float the weight of fuselage while at rest. The small horizontal vanes 12 on each side of fin, help lift the fin and provide planing surface for it to ride on until high speed is attained, when the whole plane will be supported by the trailing edge of lower wing and bottom edge of fin, until clear of water. Probably this vane will not be needed in small, high powered designs. The rudder 13, stabilizer 14, and elevators 15 are of conventional design and use, except that their proportions are modified as made necessary by the addition of the fin and the rudder is constructed to stand the strain of engaging water.

The fuselage is raised above lower wing by struts. This height is variable according to the distance above water desired to clear propellers and the diameter of propellers used. The "float line" in Fig. 2 is in the position of the plane without forward motion, afloat. The fin is well submerged and the lower wing about two thirds under water. The degree of submergence will depend on condition of loading, etc, but I prefer only 25% to 33% of weight in reserve buoyancy as excessive reserve buoyancy will make the plane too lively in a seaway.

In the design and condition shown, the lower wing has an incidence of 12 to 15 degrees to the surface of the water. As soon as motion is imparted to the plane, it tends to rise out of the water, and the incidence decreases until, as speed is gained it will be planing on the trailing edge of lower wing, with the tail fin free, or almost so, of water.

I prefer that the lower wing be built with a slight incidence to the line of thrust, say two or three degrees, that the leading edge of lower wing be out of water with the plane horizontal. Of course waves will sweep over this wing if the water is rough, but they should not materially check her speed as the leading edge is fairly sharp and any tendency to nose dive is counteracted by there always being a much greater pressure of water on the underside of wing than can possibly accumulate on top.

Alighting would be close to stalling speed. The tail fin entering water at about the same time as planing wing touches.

This is, in effect, a "three point landing" familiar to aviators and constantly practiced with land machines. Fig. 3 is a plan view of the aeroplane, bottom up. This shows the landing wheels 16 housed in the wing, also the extent of the fin 11 and its vanes 12. Fig. 4 is a rear elevation of the tail, showing fin 11, vanes 12, rudder, elevators, etc.

In Fig. 1 the retracting landing wheels are shown in position for landing. In Fig. 3 they are shown folded into circular recesses 17 in the lower surface of the wing. The flat sides of the wheels, being practically flush with wing surfaces, offer no obstacle to either wind or water, and in this position are a part of the planing surface.

Fig. 5 on Sheet #2 is a front elevation of the retracting mechanism and wheels 16, with one side in section to show construction of wheel recesses 17. Novelty is shown in the construction of lower wing (Fig. 7) in which wood sheathing 29 is laid over the wing ribs, to give stiffness to the outer skin 30 of linen or metal, preferably duralumin. Novelty is also shown in the construction of the spars, which are of two thicknesses of wood 31 with a metal plate 32 between, thru fastened, the wood serving to resist twisting, and the plate giving stiffness and strength. On large planes, where additional strength is desired, a cap plate may be laid on top and bottom of the spar, welded to the center plate.

The wheel recesses 17 are situated just aft of the leading spar and are as wide apart as desired. The wheels 16 have disc plate centers, flush with sides of tires. They are mounted on the axles 18 which may have a shock absorbing device incorporated in it. These axles are moved from vertical to horizontal planes by the strut bar 20 which engages, thru a threaded collar, the screw 21 at upper end. The screws 21 are of opposite thread on each side of center line of craft, and the pitch of thread is such that wheels may be rigidly secured in any position. These screws 21 are actuated by a shaft 22 from aviator's cockpit thru a worm and pinion 23—24 and two universal joints 25. After taking off, to house the wheels the shaft 22 is turned, causing the struts 20 to travel outboard, forcing the wheels 16 upwards. The struts 26 act as braces in the lowered position and serve to guide the wheels as they are raised, drawing them back of the spars to the recesses 17 provided. Center of wheels in lowered position are under center of spar, which is forward of center of gravity of the plane. The struts 26 have universal joints 25 on a Y at end of threaded rod 27. This rod 27 has a manual adjustment, fore and aft, consisting of a collar on aft spar and lock nuts. The wheel ends of these struts 26 are so shaped and fastened to axles that the wheels are in the plane of travel when down.

Having thus described my invention, what I claim as new and desire to secure by Letters Patent is as follows:—

1. In an aeroplane, the combination of a fore and aft frame and a transverse wing of airfoil section, itself acting as a float and having a retractable landing gear disposed therein, with a vertical buoyant fin below fore and aft frame at aft end, substantially as described.

2. In an aeroplane, the combination of a fuselage and a wing of airfoil section, itself acting as a float and having a retractable landing gear disposed therein with a vertical buoyant fin and rudder hinged to said fin below fuselage at aft end substantially as described.

EDWARD R. CARROLL.